United States Patent
Chu

(10) Patent No.: US 8,995,413 B2
(45) Date of Patent: Mar. 31, 2015

(54) SETTING METHOD FOR CONNECTING TO WIRELESS NETWORK ACCESS POINTS, AND ELECTRONIC DEVICE

(71) Applicant: Vivotek Inc., New Taipei (TW)

(72) Inventor: Chien-Wei Chu, New Taipei (TW)

(73) Assignee: Vivotek Inc., New Taipei (TW)

( * ) Notice: Subject to any disclaimer, the term of this patent is extended or adjusted under 35 U.S.C. 154(b) by 159 days.

(21) Appl. No.: 13/845,945

(22) Filed: Mar. 18, 2013

(65) Prior Publication Data
US 2014/0044113 A1 Feb. 13, 2014

(30) Foreign Application Priority Data

Aug. 10, 2012 (TW) .............................. 101129058 A

(51) Int. Cl.
*H04W 48/16* (2009.01)
*H04W 88/08* (2009.01)
*H04W 24/02* (2009.01)

(52) U.S. Cl.
CPC .............. *H04W 48/16* (2013.01); *H04W 24/02* (2013.01); *H04W 88/08* (2013.01)
USPC ......................................................... 370/338

(58) Field of Classification Search
CPC .............................. H04W 48/16; H04W 88/08
See application file for complete search history.

(56) References Cited

U.S. PATENT DOCUMENTS

| 2009/0153692 | A1* | 6/2009 | Koide ........................ 348/222.1 |
| 2010/0036740 | A1* | 2/2010 | Barashi ...................... 705/14.71 |
| 2013/0016710 | A1 | 1/2013 | Shinohara | |

OTHER PUBLICATIONS

"Izon app for izon Wi-Fi video monitors v 1.0", StemInnovation.com, Aug. 26, 2012, 17 pages, Stem Innovation, LLC.

* cited by examiner

*Primary Examiner* — Jianye Wu
(74) *Attorney, Agent, or Firm* — Muncy, Geissler, Olds & Lowe, P.C.

(57) ABSTRACT

A setting method for connecting to wireless network access points, and an electronic device are applied to connect a network video surveillance device such as a network camera, a network video server or a network video recorder to wireless network access points. A first electronic device is set to operate in an access point mode. A second electronic device is connected to the first electronic device wirelessly, and setting information of a target access point is sent to the first electronic device by the second electronic device. After the first electronic device obtains the setting information, the first electronic device is switched to operate in a client mode instead of the access point mode. The first electronic device is connected to the target access point according to the setting information.

12 Claims, 5 Drawing Sheets

SETTING METHOD FOR CONNECTING TO WIRELESS NETWORK ACCESS POINTS, AND ELECTRONIC DEVICE

CROSS-REFERENCE TO RELATED APPLICATIONS

This non-provisional application claims priority under 35 U.S.C. §119(a) on Patent Application No(s). 101129058 filed in Taiwan, R.O.C. on Aug. 10, 2012, the entire contents of which are hereby incorporated by reference.

BACKGROUND

1. Technical Field

The disclosure relates to a network setting method and an electronic device, and more particularly to a setting method for connecting to wireless network access points, and an electronic device.

2. Related Art

A network video surveillance device such as a network camera, a network video server and a network video recorder is used more and more popularly, and is gradually entering into daily life. Take the network camera as an example, more and more users are using the network cameras. Moreover, following the development of a wireless network, a network camera that is equipped with a wireless network function begins to show up in the 3C market. The first step for a user to use a wireless network camera is to install the wireless network camera. Unlike other wireless device such as notebook, tablet computer or smart phone, the wireless network camera does not have the text and graphical input/output user interface such as monitor, keyboard and touch panel for user to input settings directly. In terms of the installation of the wireless network camera, typical hardware architecture is that the wireless network camera is coupled to the wireless network access point (AP) through the Ethernet, and the AP is coupled to a personal computer (PC) or notebook with the Ethernet. For a conventional installation procedure, the PC should access connection with the corresponding AP first, and then, the user will use the PC to access the setup webpage of the AP to obtain related parameters of that AP. Next, the PC should access connection with the wireless network camera, and then, the user should use the PC to access the setup webpage of the wireless network camera and fill in the parameters in the corresponding field. This conventional procedure is inconvenient and requires longer installation time.

To solve this problem, Wi-Fi Protected Setup (WPS) is introduced. WPS is a computing standard that attempts to allow easy establishment of a secure wireless network. If both the AP and the wireless network camera support WPS feature, user could simply push the WPS buttons of the AP and the wireless network camera at the same time to finish the wireless setup for the wireless network camera. However, if the AP does not support WPS feature, user cannot take the advantage of WPS.

SUMMARY

In view of the problem mentioned above, the disclosure provides a setting method for connecting wireless network access points, which is applied to a network video surveillance for setting the network video surveillance device to connect to wireless network access points.

A setting method for connecting to wireless network access points disclosed in the disclosure includes the following steps. A first electronic device is set to operate in an access point mode. A second electronic device is connected to the first electronic device wirelessly, and setting information of a target access point is sent to the first electronic device by the second electronic device. After the first electronic device obtains the setting information, the first electronic device is switched to operate in a client mode instead of the access point mode. The first electronic device is connected to the target access point according to the setting information.

According to an embodiment, the first electronic device is a network video surveillance device such as a network camera, a network video server or a network video recorder that does not have the text and graphical input/output user interface such as the monitor, keyboard, and touch panel.

According to an embodiment, the second electronic device is a smart phone, a tablet computer, a notebook or a desktop computer.

According to an embodiment, the first electronic device in the access point mode can perform the site survey to search nearby wireless network access points.

According to an embodiment, the step of sending the setting information is performed when the first electronic device executes a program and the second electronic device executes a matching program.

According to an embodiment, the program executed by the first electronic device is a web server program or other server programs with a network function.

According to an embodiment, the matching program executed by the second electronic device is a web browser or a camera installation program.

An electronic device with a wireless network function disclosed in the disclosure includes a mode switching unit, a first signal access unit and a processing unit. The mode switching unit is used for switching the electronic device to operate in an access point mode or a client mode. The first signal access unit is used for receiving or sending a wireless network signal. The processing unit is electrically connected to the mode switching unit and the first signal access unit. The processing unit is used for receiving setting information from a client end in the access point mode, and for connecting the electronic device to a target access point according to the setting information in a client mode.

According to an embodiment, the step of receiving the setting information from the client end is performed through a program executed by the electronic device.

According to an embodiment, the setting method for connecting to wireless network access points in the disclosure is applied to a network video surveillance device such as a network camera, a network video server or a network video recorder, for setting the network video surveillance device to connect to a wireless network. Therefore, the electronic device of the disclosure can complete the connection setting of wireless network without the conventional connection and setting process.

BRIEF DESCRIPTION OF THE DRAWINGS

The disclosure will become more fully understood from the detailed description given herein below for illustration only and thus does not limit the disclosure, wherein.

DETAILED DESCRIPTION

Figure 1A:
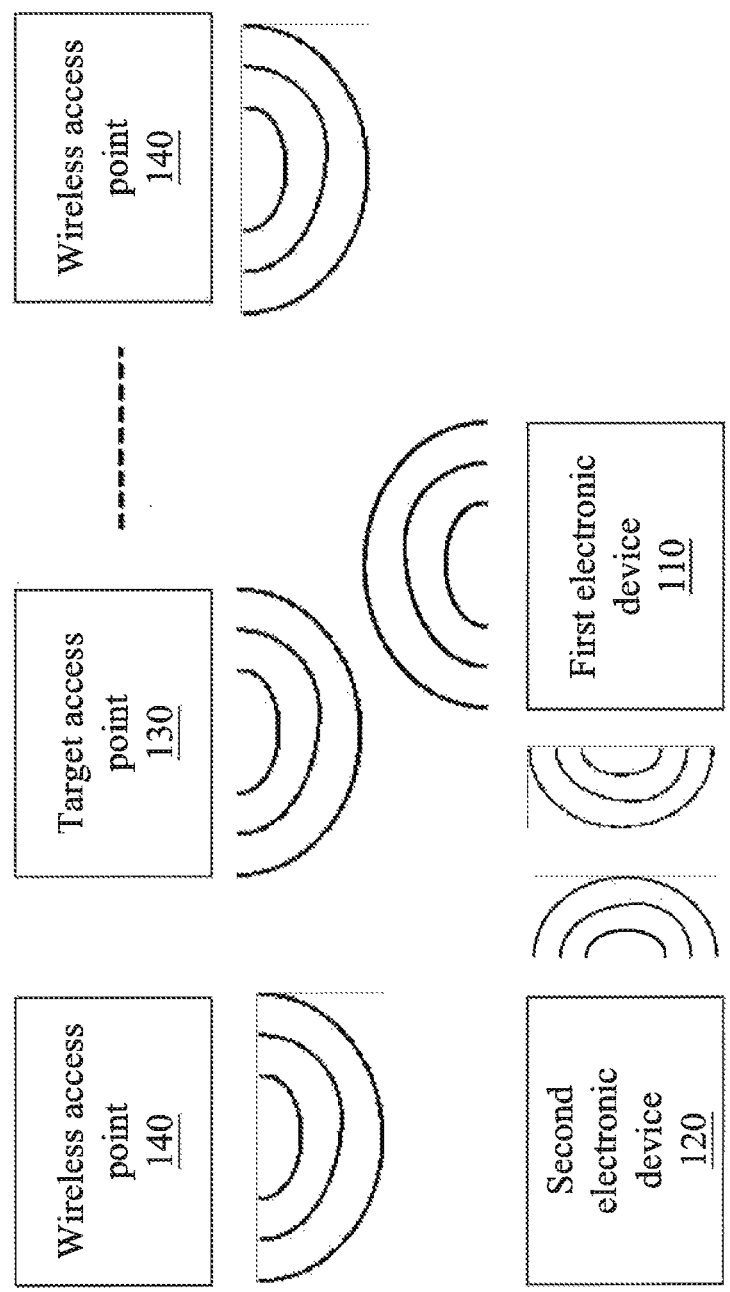
FIG. 1A is a schematic architectural view of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure is applied to a network video surveillance device such as a network camera, a network video server or a network video recorder, for setting the network video surveillance device to connect to a wireless network access point.

FIG. 1A is a schematic architectural view of the disclosure. The disclosure includes a first electronic device 110, a second electronic device 120 and a target access point 130. The first electronic device 110 is, for example, a network camera, a network video server or a network video recorder that does not have the text and graphical input/output user interface such as monitor, keyboard, and touch panel. The second electronic device 120 is, for example, a mobile phone, a tablet computer, a notebook or an electronic device with a wireless network function. Hereinafter, one wireless network access point 140 desired to connect to, is defined as a target access point 130.

Figure 1B:
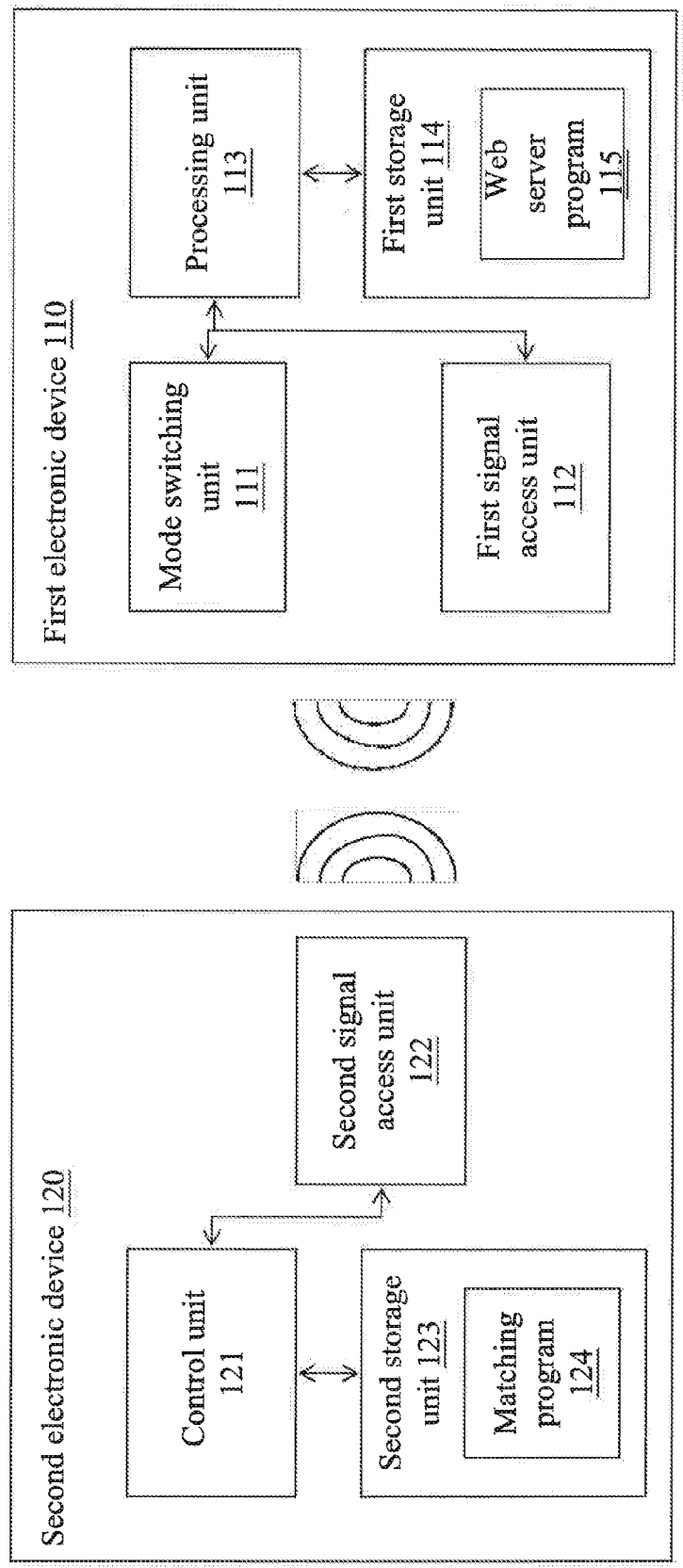
FIG. 1B is a schematic architectural view of a first electronic device and a second electronic device according to an embodiment of the disclosure.

The first electronic device 110 includes a mode switching unit 111, a first signal access unit 112, a processing unit 113 and a first storage unit 114. Referring to FIG. 1B, the processing unit 113 is electrically connected to the mode switching unit 111, the first signal access unit 112 and the first storage unit 114.

The mode switching unit 111 is used for switching the first electronic device 110 to operate in an access point mode or a client mode. When the first electronic device 110 is in the access point mode, the processing unit 113 executes a web server program 115. When the first electronic device 110 executes the web server program 115, the first electronic device 110 provides a corresponding web page and a form. The details of the web page and the form will be described later.

When the first electronic device 110 is switched to operate in the client mode, the first electronic device 110 connects to the target access point 130 according to setting information for a wireless network. The setting information is stored in the first electronic device 110. The mode switching unit 111 provides a user interface, so that a user can use the user interface of the mode switching unit 111 to reset the first electronic device 110 to operate in the access point mode. The user interface of the mode switching unit 111 can be embodied by physical elements such as physical buttons or switches, and can also be embodied by software such as virtual buttons or switches shown on a display device.

The processing unit 113 receives or sends wireless network signals through the first signal access unit 112. In other words, the first electronic device 110 communicates with the second electronic device 120 or the target access point 130 through the wireless network communication supported by the first signal access unit 112. The wireless network communication employs one standard of the IEEE 802.11 family. The first storage unit 114 is used for storing the web server program 115 and the setting information of the target access point 130.

The second electronic device 120 includes a control unit 121, a second signal access unit 122 and a second storage unit 123. The control unit 121 is electrically connected to the second signal access unit 122 and the second storage unit 123. The second signal access unit 122 is used for receiving or sending wireless network signals. The second electronic device 120 communicates with the first electronic device 110 through the second signal access unit 122. The second storage unit 123 stores a matching program 124. The matching program 124 receives information provided by the web server program 115, and the user can also upload relevant information to the web server program 115 through the matching program 124. The matching program 124 is, for example, a web browser or an installation program, and the installation program is software for setting the first electronic device 110 to communicate with the target access point 130. The detailed operation of the disclosure is described as follows.

Figure 2:
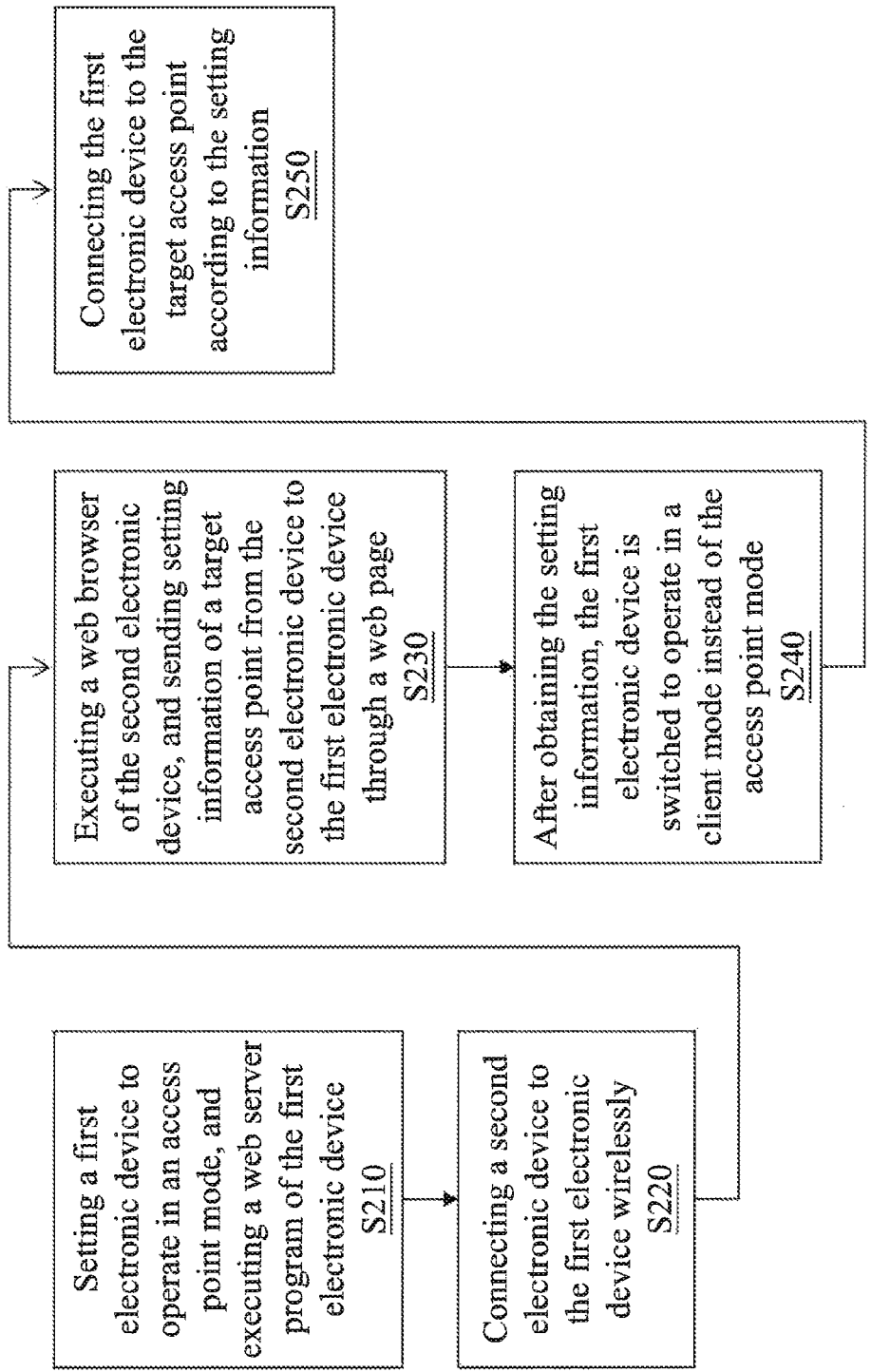
FIG. 2 is a flow chart of a setting method for connecting to wireless network access points, according to an embodiment of the disclosure.

FIG. 2 is a flow chart of the operation of the disclosure. The setting method for the wireless network of the first electronic device 110 in FIG. 1B according to the disclosure includes the following steps.

In step S210, the first electronic device 110 is set to operate in an access point mode, and a web server program of the first electronic device 110 is executed.

In step S220, a second electronic device 120 in FIG. 1B is connected to the first electronic device 110 wirelessly.

In step S230, a web browser of the second electronic device 120 is executed, and the second electronic device 120 sends setting information of a target access point 130 in FIG. 1A to the first electronic device 110 through a web page.

In step S240, after the first electronic device 110 acquires the setting information, the first electronic device 110 is switched to operate in a client mode instead of the access point mode.

In step S250, the first electronic device 110 is connected to the target access point 130 according to the setting information.

Specifically, the first electronic device 110 is set to operate in the access point mode firstly with a default SSID and related wireless settings such as an encryption manner, an encryption key, and a communication channel. In the access point mode, the first electronic device 110 starts to search for nearby wireless network access points 140. The first electronic device 110 records service set identifiers (SSIDs) of found wireless network access points 140 one by one to establish an access point list. Furthermore, in the access point mode, the first electronic device 110 also executes a web server program 115. When a client end communicates with the first electronic device 110 through a web page, the web server program 115 sends the access point list to the client end. In this and some embodiments, the step of searching for nearby wireless network access points 140 may be not performed. In this and some embodiments, and the step of searching for nearby wireless network access points 140 may be performed when the user inputs a search command through a web page or software.

Subsequently, the second electronic device 120 is connected to the first electronic device 110 through the wireless network using the SSID and related wireless settings of the first electronic device 110, and executes a matching program 124. Hereinafter, which the matching program 124 is a web browser is taken as an example. The web server program 115 sends the access point list to the matching program 124. The user can know nearby wireless network access points 140 through the matching program 124. The user selects desired one of the wireless network access points 140 from the access point list of the matching program 124 as a target access point 130. After the target access point 130 is selected, the matching program 124 presents a setting information page of the target access point 130. The setting information is, for example, a SSID, an encryption manner, or an encryption key. If the first electronic device 110 does not perform the step of searching for wireless network access points 140, the user can set a known wireless network access point 140 as the target access point 130, and input a SSID of the target access point 130.

Figure 3B:
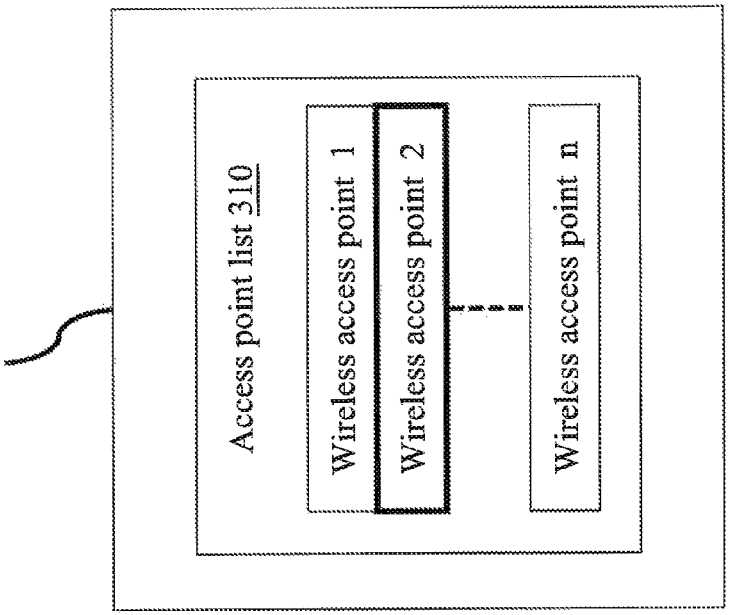
FIG. 3A to FIG. 3C are schematic views for a setting process of setting information according to an embodiment of the disclosure.
Figure 3A:
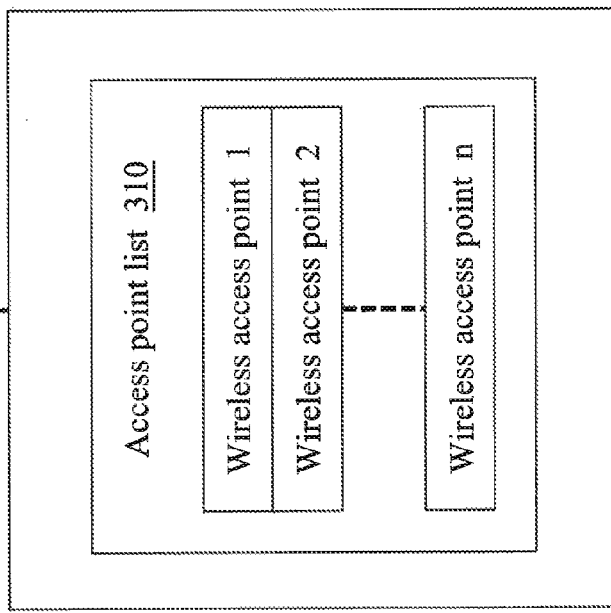
Figure 3C:
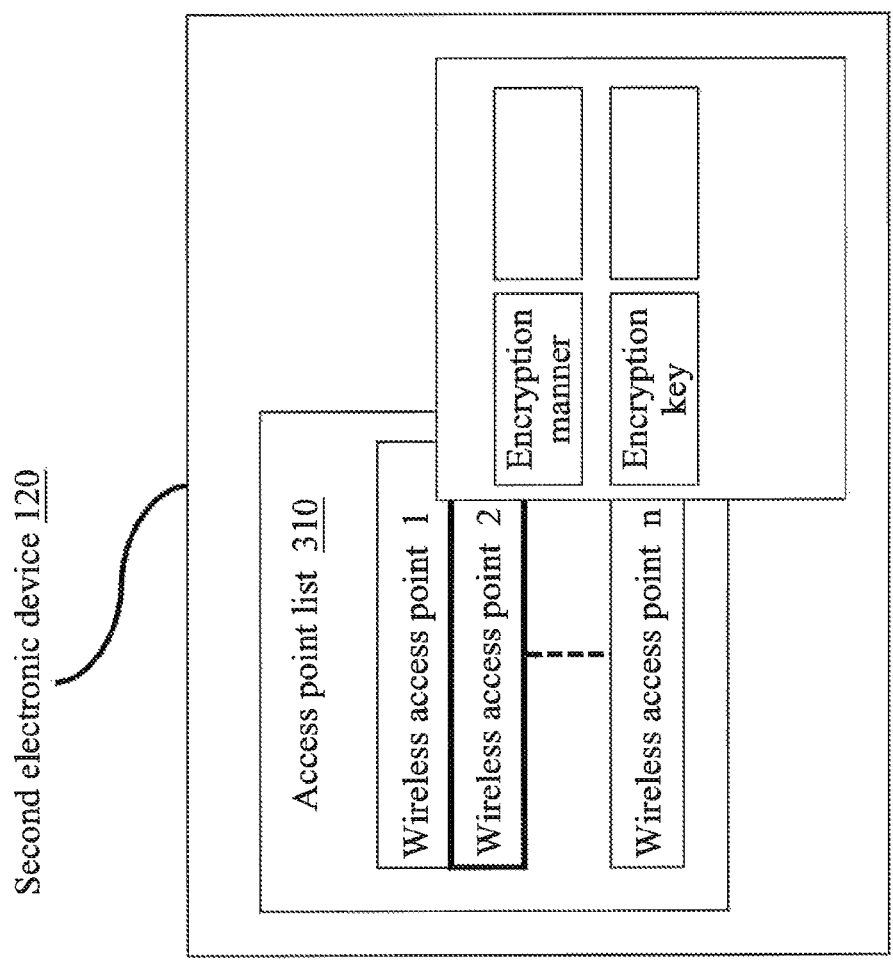

FIG. 3A to FIG. 3C are the schematic views for a setting process of setting information according to an embodiment of the disclosure. The matching program 124 presents a received access point list 310 on a display unit of the second electronic device 120, as shown in FIG. 3A. Next, the user selects any one of the wireless network access points 140 from the access point list 310 as a target access point 130, as shown by the marked one in FIG. 3B. When the user selects a target access point 130, the matching program 124 presents another page, so that the user can input the setting information of the target access point 130 on the presented another page, as shown in FIG. 3C. After inputting the setting information, the user uploads the setting information to the web server program 115 through the matching program 124.

After the web server program 115 receives the setting information sent from the matching program 124, the first electronic device 110 is switched to operate in the client mode instead of the access point mode, and communicates with the target access point 130 according to the setting information.

The setting method for connecting to wireless network access points according to the disclosure is applied to a network video surveillance device for setting the network video surveillance device to connect to a wireless network. The electronic device of the disclosure can complete the connection setting of wireless network without the conventional connection and setting process.

What is claimed is:

1. A setting method for connecting to wireless network access points, comprising:
   setting a first electronic device to operate in an access point mode;
   wirelessly connecting a second electronic device to the first electronic device, so as to send setting information of a target access point to the first electronic device from the second electronic device;
   after the first electronic device obtains the setting information, switching the first electronic device to operate in a client mode instead of the access point mode; and
   connecting the first electronic device to the target access point according to the setting information,
   wherein the target access point is different from the first electronic device and the second electronic device.

2. The setting method for connecting to wireless network access points according to claim 1, further comprising:
   searching for wireless network access points by the first electronic device in the access point mode; and
   recording a service set identifier (SSID) of at least one found wireless network access point to establish an access point list by the first electronic device in the access point mode,
   wherein the wireless network access points are different from the first electronic device and the second electronic device.

3. The setting method for connecting to wireless network access points according to claim 2, further comprising:
   acquiring the access point list from the first electronic device in the access point mode by the second electronic device; and
   selecting one of the at least one found wireless network access point from the access point list, and defining the selected found wireless network access point as the target access point.

4. The setting method for connecting to wireless network access points according to claim 1, wherein the step of sending the setting information to the first electronic device comprises:
   executing a web server program of the first electronic device;
   executing a matching program of the second electronic device; and
   receiving the setting information sent by the matching program, by the web server program.

5. The setting method for connecting to wireless network access points according to claim 4, wherein the matching program is a web browser or an installation program.

6. An electronic device with a wireless network function, comprising:
   a mode switching unit, for switching the electronic device to operate in an access point mode or a client mode;
   a first signal access unit, for receiving or sending a wireless network signal; and
   a processing unit, electrically connected to the mode switching unit and the first signal access unit, for receiving setting information from a client end in the access point mode, and for controlling the electronic device to connect to a target access point according to the setting information in the client mode,
   wherein the target access point is different from the first electronic device and the second electronic device.

7. The electronic device with the wireless network function according to claim 6, wherein the processing unit is further used for recording a service set identifier of at least one found wireless network access point to establish an access point list, and
   wherein the wireless network access point is different from the first electronic device and the second electronic device.

8. The electronic device with the wireless network function according to claim 7, wherein the processing unit sends the access point list to the client end through the first signal access unit, and the client end selects the target access point from the access point list.

9. The electronic device with the wireless network function according to claim 6, wherein the mode switching unit comprises a user interface, so that the electronic device is reset through the user interface to operate in the access point mode.

10. The electronic device with the wireless network function according to claim 9, wherein the user interface is a physical switch, a physical button, a virtual switch or a virtual button.

11. The electronic device with the wireless network function according to claim 6, wherein when the electronic device is in the access point mode, the processing unit executes a web server program, so as to receive the setting information from the client.

12. The electronic device with the wireless network function according to claim 6, wherein the electronic device is a network camera, a network video server or a network video recorder.

* * * * *